(12) United States Patent
Iwahara

(10) Patent No.: US 10,838,670 B2
(45) Date of Patent: Nov. 17, 2020

(54) PRINTING APPARATUS AND METHOD FOR PRINTING BASED ON PRESENCE OR ABSENCE OF INPUT INFORMATION FROM A PERIPHERAL DEVICE

(71) Applicant: SEIKO EPSON CORPORATION, Tokyo (JP)

(72) Inventor: Yuma Iwahara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/522,383

(22) Filed: Jul. 25, 2019

(65) Prior Publication Data
US 2020/0034091 A1 Jan. 30, 2020

(30) Foreign Application Priority Data
Jul. 26, 2018 (JP) .................................. 2018-139919

(51) Int. Cl.
*G06F 3/12* (2006.01)
*G06K 15/02* (2006.01)

(52) U.S. Cl.
CPC .......... *G06F 3/1211* (2013.01); *G06F 3/1267* (2013.01); *G06K 15/1805* (2013.01); *G06K 15/1817* (2013.01)

(58) Field of Classification Search
None
See application file for complete search history.

(56) References Cited

U.S. PATENT DOCUMENTS

| 6,075,618 | A | * | 6/2000 | Nakai | G06F 3/1203 358/1.16 |
| 6,211,966 | B1 | * | 4/2001 | Osada | G06F 3/1204 345/2.1 |
| 9,665,242 | B2 | * | 5/2017 | Kim | G06F 9/4411 |
| 2003/0184774 | A1 | * | 10/2003 | Minowa | G06K 15/02 358/1.9 |
| 2014/0250311 | A1 | * | 9/2014 | Kubota | G06F 1/266 713/310 |
| 2015/0002896 | A1 | | 1/2015 | Takasu et al. | |
| 2015/0188724 | A1 | * | 7/2015 | Kim | G06F 3/048 340/3.71 |

FOREIGN PATENT DOCUMENTS

| JP | 2013-186488 A | 9/2013 |
| JP | 2016-170803 A | 9/2016 |

* cited by examiner

*Primary Examiner* — Thomas D Lee
(74) *Attorney, Agent, or Firm* — Chip Law Group

(57) ABSTRACT

A printer includes a printer communicator configured to communicate with a host device, a device communicator configured to communicate with a plurality of devices, a printer controller performing a process based on commands acquired via the printer communicator, and a shared buffer configured to store input information corresponding to each of a plurality of devices, where the input information is acquired via the device communicator. When the printer communicator receives a device control command including a device designation parameter designating a predetermined device among a plurality of devices, the printer controller acquires, from the shared buffer, buffer information indicating whether input information corresponding to the predetermined device designated by the device designation parameter is present in the shared buffer or input information.

10 Claims, 5 Drawing Sheets

PRINTING APPARATUS AND METHOD FOR PRINTING BASED ON PRESENCE OR ABSENCE OF INPUT INFORMATION FROM A PERIPHERAL DEVICE

The present application is based on, and claims priority from JP Application Serial Number 2018-139919, filed Jul. 26, 2018, the disclosure of which is hereby incorporated by reference herein in its entirety.

BACKGROUND

1. Technical Field

The present disclosure relates to a printing apparatus and a control method of the printing apparatus.

2. Related Art

In the related art, there is known an apparatus performing a process in accordance with the presence or absence of input information from a peripheral device (see, for example, JP-A-2013-186488). JP-A-2013-186488 discloses a printing apparatus that adds identification information identifying an input device of an input source to input information when information is input from an input device that is a peripheral device, and transmits the input information to a tablet terminal. Generally, a printing apparatus as described in JP-A-2013-186488 receives one kind of command corresponding to one peripheral device from a communicable control device, and performs the process in accordance with the presence or absence of input information from the one peripheral device.

SUMMARY

One of the objects of the present disclosure is to enable a process in accordance with the presence or absence of input information from a peripheral device to be performed for each of the plurality of peripheral devices by one type of command. A printing apparatus according to an aspect of the present disclosure includes a first communicator configured to communicate with a control device, a second communicator configured to communicate with a plurality of peripheral devices, a controller performing a process based on a command acquired via the first communicator, and a buffer configured to store input information corresponding to each of the plurality of peripheral devices, the input information being acquired via the second communicator, wherein when the first communicator receives a device control command including designation information that designates a predetermined peripheral device of the plurality of peripheral devices, the first controller acquires, from the buffer, buffer information indicating whether the input information corresponding to the predetermined peripheral device designated by the designation information is present in the buffer or the input information.

In the printing apparatus, the controller may transmit to the control device the buffer information indicating that the input information is present or the input information when the input information corresponding to the predetermined peripheral device designated by the designation information is present in the buffer.

In the printing apparatus, the controller may transmit to the control device the buffer information indicating that the input information is not present when the input information corresponding to the predetermined peripheral device designated by the designation information is not present in the buffer.

The printing apparatus may further include a print device that performs printing on a print medium, wherein the controller may be configured to switch between a first mode for controlling the print device and a second mode for performing a process without operating the print device, and perform the process based on the device control command when the controller is in the second mode.

In the printing apparatus, the controller may control the print device when the command received by the first communicator is a print command, and perform a process based on the device control command when the command received by the first communicator is the device control command.

In the printing apparatus, while performing the command received by the first communicator in an order of reception, the controller may perform the process based on the device control command prior to a process based on the command received before the device control command is received when the first communicator receives the device control command.

In the printing apparatus, the controller may perform the process based on the device control command in a case in which the first communicator receives the device control command when the controller is not able to perform control of the print device based on the print command.

In the printing apparatus, the controller may monitor a presence or absence of the input information corresponding to the predetermined peripheral device designated by the designation information when the first communicator receives the device control command, and transmit to the control device buffer information indicating that the input information is present when the input information is stored in the buffer.

A printing apparatus according to another aspect of the present disclosure includes a first communicator configured to communicate with a control device, a second communicator configured to communicate with a plurality of peripheral devices, a first controller performing a process based on a command acquired via the first communicator, a second controller controlling the peripheral devices via the second communicator, and a buffer to and from which the first controller and the second controller is configured to input and output information, and which is configured to store, by the second controller, input information corresponding to each of the plurality of peripheral devices, wherein when the first communicator receives a device control command including designation information that designates a predetermined peripheral device of the plurality of peripheral devices, the controller acquires, from the buffer, buffer information indicating whether the input information corresponding to the predetermined peripheral device designated by the designation information is present in the buffer or the input information.

In a control method of a printing apparatus according to yet another aspect of the present disclosure, the printing apparatus includes a first communicator configured to communicate with a control device, a second communicator configured to communicate with a plurality of peripheral devices, a controller performing a process based on a command acquired via the first communicator, and a buffer configured to store input information corresponding to each of the plurality of peripheral devices, the input information being acquired via the second communicator, wherein when the first communicator receives a device control command including designation information that designates a predetermined peripheral device of the plurality of peripheral devices, the controller acquires, from the buffer, buffer information indicating whether the input information corresponding to the predetermined peripheral device designated by the designation information is present in the buffer or the input information.

DESCRIPTION OF EXEMPLARY EMBODIMENTS

Figure 1:
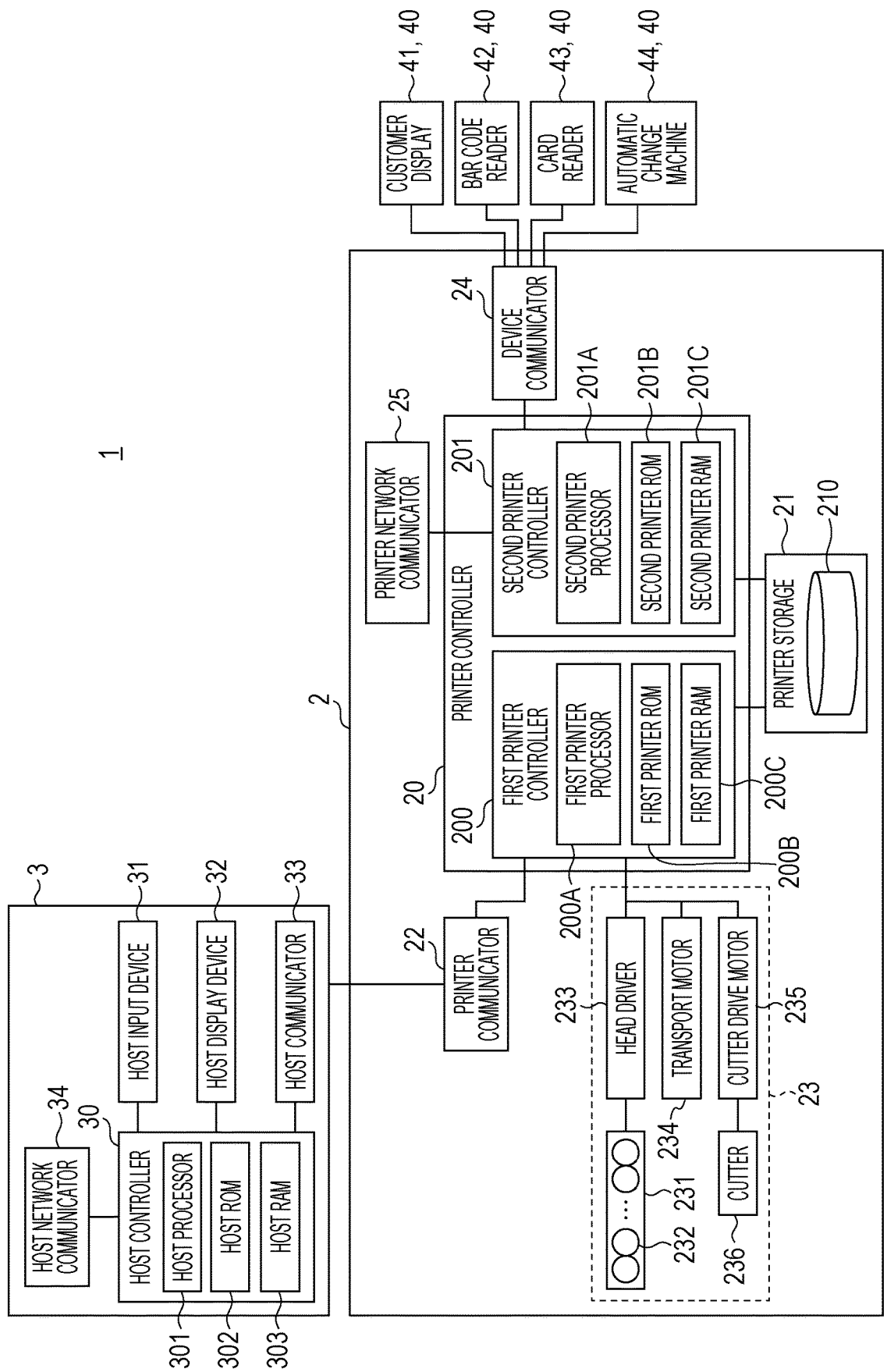
FIG. 1 is a diagram showing the configuration of a printer and a host device.

FIG. 1 is a diagram showing the configuration of a printer 2 and a host device 3. As shown in FIG. 1, a printing system 1 includes the printer 2 and the host device 3. The printer 2 is a printing apparatus. The host device 3 is a control device. The printing system 1 functions as a POS system. The POS system is a system used in operations of the retailing industry such as shopping centers, convenience stores and in-vehicle sales, and the catering industry such as restaurants, coffee shops and pubs. The POS system has a function of performing accounting in accordance with a product purchased by a customer, and a function of issuing a receipt in accordance with accounting.

The printer 2 is a thermal printer that accommodates roll paper, which is an aspect of a print medium, and forms dots on the accommodated roll paper with a print head 231 of the line-type thermal method to print characters, images, and the like. Although the printing method of the printer 2 according to the present embodiment exemplifies a thermal method, the printing method of the printer 2 is not limited to the thermal method, and may be another printing method such as an ink jet method. Further, the print head 231 of the printer 2 is not limited to the line type, and may be a serial type.

The host device 3 is a device controlling the printer 2 and is, for example, a desktop type, laptop type, or tablet type personal computer. The host device 3 may also be a dedicated computer that controls the printer 2.

First, the host device 3 will be described. The host device 3 includes a host controller 30, a host input device 31, a host display device 32, a host communicator 33, and a host network communicator 34.

The host controller 30 includes a host processor 301 executing arithmetic processing such as a CPU, a host ROM 302, and a host RAM 303. The host controller 30 performs a process in cooperation of hardware and software so that the host processor 301 reads the control program stored in the host ROM 302 to the RAM 302 and executes the process. The host ROM 302 and the host RAM 303 constitute a storage that stores various data. The host processor 301 controls respective sections of the host device 3 by reading and executing the control program stored in the host ROM 302. The host ROM 302 is a ROM that stores data in a nonvolatile manner. The host ROM 302 stores various data in a non-volatile manner in addition to the control program executed by the host processor 301. The host RAM 303 is a RAM that temporarily stores various data. The host RAM 303 functions as a work area of the host processor 301.

The host input device 31 (host input equipment) includes an operation switch provided on the host device 3 and an input unit such as a keyboard, a touch panel, etc., which are connected to the host device 3, and detects a user's operation on the input unit, and outputs the operation to the host controller 30. The host controller 30 performs a process corresponding to the operation on the input unit based on the input from the host input device 31.

The host display device 32 (host display equipment, host display) includes a plurality of LEDs, a display panel, etc., and turns on and blinks the LEDs in a predetermined manner and display various information on the display panel under the control of the host controller 30.

The host communicator 33 (host communication equipment) includes a communication device configured by hardware necessary for communication such as a connector and an interface circuit in accordance with a predetermined communication standard, and communicates with a printer communicator 22 of the printer 2 in accordance with the predetermined communication standard under the control of the host controller 30. The communication standard used between the host communicator 33 and the printer communicator 22 may be a standard relating to wired communication or a standard relating to wireless communication. Examples of the standard relating to wired communication include a serial communication standard such as a USB and an RC232C, a parallel communication standards such as an IEEE1284, Ethernet, and the like. Ethernet is a registered trademark. Further, examples of the standard relating to wireless communication include a communication standard relating to a wireless LAN such as Wi-Fi, a communication standard relating to a short distance wireless communication such as Bluetooth, and the like. Wi-Fi is a registered trademark. Bluetooth is a registered trademark.

The host network communicator 34 (host network communication equipment) communicates with a device such as a Web server connected to the global network in accordance with a predetermined communication standard under the control of the host controller 30. Examples of the communication standard used for communication by the host network communicator 34 include an HTTP and a WebSocket, and the like.

Next, the printer 2 will be described. The printer 2 includes a printer controller 20, a printer storage 21, the printer communicator 22, a print device 23, a device communicator 24, and a printer network communicator 25.

The printer controller 20 corresponds to a controller. The printer communicator 22 corresponds to a first communicator. The device communicator 24 corresponds to a second communicator.

The printer controller 20 includes a first printer controller 200 and a second printer controller 201. The first printer controller 200 corresponds to a first controller. The second printer controller 201 corresponds to a second controller.

The first printer controller 200 includes a first printer processor 200A executing arithmetic processing such as a CPU, a first printer ROM 200B, and a first printer RAM 200C. The first printer controller 200 performs a process in cooperation of hardware and software so that the first printer processor 200A reads the control program stored in the first printer ROM 200B to the first printer RAM 200C and executes the process. The first printer ROM 200B and the first printer RAM 200C constitute a storage that stores various data relating to the first printer controller 200.

The first printer processor 200A controls the printer communicator 22 and the print device 23 by reading and executing the control program stored in the first printer ROM 200B. The first printer ROM 200B is a ROM that stores data in a non-volatile manner. The first printer ROM 200B stores various data in a non-volatile manner in addition to the control program executed by the first printer processor 200A. The first printer RAM 200C is a RAM that temporarily stores various data. The first printer RAM 200C functions as a work area of the first printer processor 200A.

The second printer controller 201 includes a second printer processor 201A executing arithmetic processing such as a CPU, a second printer ROM 201B, and a second printer RAM 201C. The second printer controller 201 performs a process in cooperation of hardware and software so that the second printer processor 201A reads the control program stored in the second printer ROM 201B to the second printer RAM 201C and executes the process. The second printer ROM 201B and the second printer RAM 201C constitute a storage that stores various data relating to the second printer controller 201.

The second printer processor 201A controls the device communicator 24 and the printer network communicator 25 by reading and executing the control program stored in the second printer ROM 201B. The second printer ROM 201B is a ROM that stores data in a nonvolatile manner. The second printer ROM 201B stores various data in a non-volatile manner in addition to the control program executed by the second printer processor 201A. The second printer RAM 201C is a RAM that temporarily stores various data. The second printer RAM 201C functions as a work area of the second printer processor 201A.

The printer storage 21 (printer memory equipment) is constituted by a memory device configured to store data in a volatile or nonvolatile manner, and includes at least a shared buffer 210 in the present embodiment. The shared buffer 210 is constituted by, for example, a volatile or non-volatile semiconductor memory, and is a buffer which the first printer controller 200 and the second printer controller 201 can write information on and read information from by sharing the information. The shared buffer 210 corresponds to a buffer.

The printer communicator 22 (printer communication equipment) includes a communication device configured by hardware necessary for communication such as a connector and an interface circuit in accordance with a predetermined communication standard, and communicates with the host communicator 33 in accordance with the communication standard under the control of the first printer controller 200.

The print device 23 performs printing based on the print command received from the host controller 30 in accordance with the control of the first printer controller 200. The print command is a command instructing printing of characters, images and the like on roll paper, and includes a command instructing printing of a character code and a character code. The print command is a command of a command system associated with the printer 2. The print device 23 includes the print head 231, a head driver 233, a transport motor 234, a cutter drive motor 235, and a cutter 236.

The print head 231 has a plurality of heating elements 232 composed of resistors wherein the heating elements 232 are arranged in a cross direction crossing the roll paper transport direction. An example of the direction intersecting the transport direction includes a direction orthogonal to the transport direction. The print head 231 generates heat by energizing the heating elements 232 and applies heat to the printing surface of the roll paper to print characters, images and the like.

The head driver 233 includes hardware necessary to drive the print head 231 such as a circuit, and controls energization of the heating elements 232 of the print head 231 under the control of the first printer controller 200. The head driver 233 is an example of a head drive circuit.

The transport motor 234 rotates the transport roller under the control of the first printer controller 200 to transport the roll paper in the transport direction.

The cutter drive motor 235 is driven under the control of the first printer controller 200 so as to slide the movable blade constituting the cutter 236 toward the fixed blade so that the cutter 236 cuts the roll paper.

The device communicator 24 (device communication equipment) includes a port in accordance with a USB standard, a port in accordance with a serial communication standard other than that of a USB, a port in accordance with a parallel communication standard, a port in accordance with a communication standard relating to a wired LAN such as Ethernet, and an interface board composed of a circuit having other ports. A device 40 can be connected to each port. The device 40 corresponds to a peripheral device. In the present embodiment, the device 40 is a name when a customer display 41, a bar code reader 42, a card reader 43, and an automatic change machine 44, which will be described later, are not distinguished. The device communicator 24 communicates with the device 40 connected to the printer 2 through the port under the control of the second printer controller 201.

The customer display 41, the bar code reader 42, the card reader 43, and the automatic change machine 44 are connected to the printer 2 as externally connected devices 40. These devices 40 correspond to peripheral devices. These devices 40 are different in type.

The customer display 41 displays information on accounting under the control of the second printer controller 201. The information displayed on the customer display 41 can be viewed, for example, by a customer who settles an account at a checkout counter.

The bar code reader 42 reads a barcode attached to a product or a package of the product, and the like, and outputs read information indicating a reading result to the device communicator 24. The device communicator 24 outputs the read information input from the bar code reader 42 to the second printer controller 201.

The card reader 43 magnetically reads information recorded on a magnetic card type recording medium such as a credit card or a membership card, and outputs read information indicating a reading result to the device communicator 24. The device communicator 24 outputs the read information input from the card reader 43 to the second printer controller 201.

The automatic change machine 44 (cash drawer) has at least a money receiving port into which money received from a customer is put, and a change discharge port from which money relating to change is discharged, and discharges the corresponding change from the change discharge port under the control of the second printer controller 201 when the money is put into the money receiving port.

The printer network communicator 25 (printer network communication equipment) communicates with a device such as a Web server connected to the global network in accordance with a predetermined communication standard under the control of the printer controller 20. Examples of the communication standard used by the printer network communicator 25 for communication include an HTTP, a WebSocket and the like.

Figure 2:
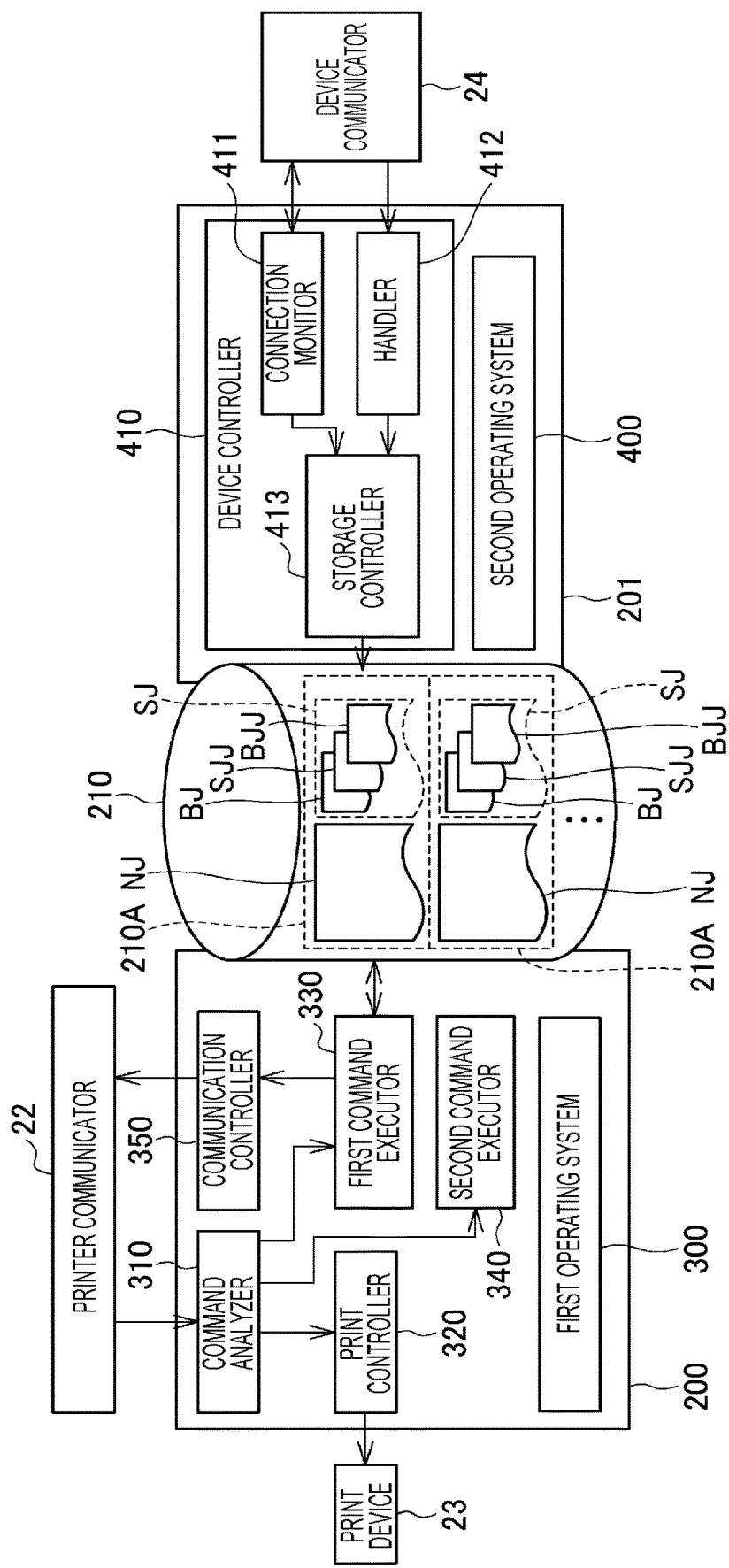
FIG. 2 is a diagram showing the functional configuration of a printer controller.

FIG. 2 is a diagram showing a functional configuration of the first printer controller 200 and the second printer controller 201 of the printer controller 20. In FIG. 2, the printer communicator 22, the print device 23, the device communicator 24, and the shared buffer 210 are illustrated for the convenience of description.

As shown in FIG. 2, the first printer controller 200 has the functions of a first operating system 300, a command analyzer 310, a print controller 320, a first command executor 330, a second command executor 340, and a communication controller 350. The function of the first operating system 300 is a function of the control program stored in the first printer ROM 200B, and the other functional sections have the functions of the application program executed on the first operating system 300.

The first operating system 300 is, for example, a real-time operating system such as a T-Kernel from the viewpoint of securing the efficient operation for the print device 23 that performs real-time control of the printing mechanism such as the print head 231 and the transport motor 234.

The command analyzer 310 is a functional section that analyzes a command received by the printer communicator 22. The command analyzer 310 identifies whether the received command is a print command, a device control command CD to be described later, or another command. The identification of the command is performed, for example, by identifying the command code. The device control command CD corresponds to a device control command. When the command received by the printer communicator 22 is a print command, the command analyzer 310 outputs the print command to the print controller 320. Further, when the command received by the printer communicator 22 is the device control command CD, the command analyzer 310 outputs the device control command CD to the first command executor 330. In addition, when the command received by the printer communicator 22 is a command other than the print command and the device control command CD, the command analyzer 310 outputs the command to the second command executor 340.

Figure 3:
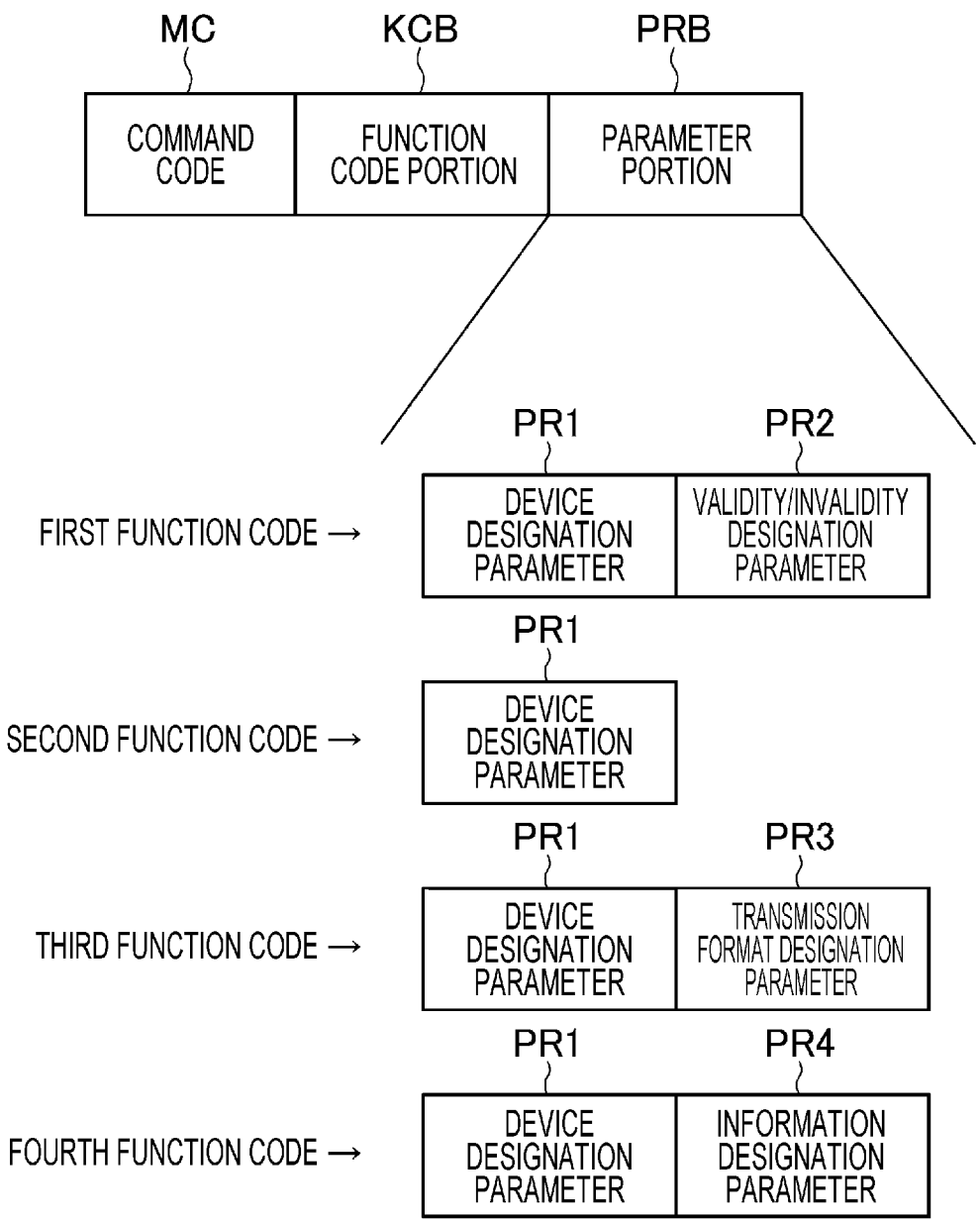
FIG. 3 is a diagram showing the configuration of a device control command.

The device control command CD will be described. FIG. 3 is a diagram showing the configuration of the device control command CD.

The device control command CD is a command instructing execution of processing relating to the device 40 connectable to the printer 2. The device control command CD includes at least a command code MC, a function code portion KCB, and a parameter portion PRB. The command code MC is a command code dedicated to the device control command CD. Therefore, even when the function code portion KCB and the parameter portion PRB are different, the device control command CD is all the same kind of command because the command code MC is not different.

A function code designating the function of the device control command CD is set in the function code portion KCB. A function code that designates any one of the first function, the second function, the third function, and the fourth function is set in the function code portion KCB in the present embodiment.

The first function is a function to enable or disable automatic notification of status information SJ. The status information SJ will be described later. Hereinafter, the function code which shows the first function is referred to as a first function code. The second function is a function of performing buffer clearing for the shared buffer 210. The buffer clearing is to clear the information stored in the shared buffer 210.

Hereinafter, the function code which shows the second function is referred to as a second function code. The third function is a function of acquiring input information NJ input to the printer 2 by the device 40. Hereinafter, the function code which shows the third function is referred to as a third function code. The fourth function is a function of acquiring the status information SJ (at least one of buffer information BJ, connection state information SJJ, and buffer state information BJJ). Hereinafter, the function code showing the fourth function is referred to as fourth function code. The buffer information BJ, the connection state information SJJ, and the buffer state information BJJ will be described later.

Although different parameters are set depending on the first function, the second function in the parameter portion PRB, the third function, and the fourth function, a device designation parameter PR1 is set commonly for each function. The device designation parameter PR1 is a parameter that designates the device 40 to execute the function indicated by the function code set in the function code portion KCB. The device designation parameter PR1 corresponds to designation information.

When the first function code is set in the function code portion KCB, the device designation parameter PR1 and a validity/invalidity designation parameter PR2 are set in the parameter portion PRB. The validity/invalidity designation parameter PR2 is a parameter that designates valid or invalid for the automatic notification of the status information SJ. When the second function code is set in the function code portion KCB, the device designation parameter PR1 is set in the parameter portion PRB. When the third function code is set in the function code portion KCB, the device designation parameter PR1 and a transmission format designation parameter PR3 are set in the parameter portion PRB. The transmission format designation parameter PR3 is a parameter that designates whether to transmit the input information NJ as binary data or as data of a hexadecimal character string. When the fourth function code is set in the function code portion KCB, the device designation parameter PR1 and an information designation parameter PR5 are set in the parameter portion PRB. The information designation parameter PR5 is a parameter designating any one of the buffer information BJ, the connection state information SJJ, and the buffer state information BJJ.

Referring to FIG. 2, the print controller 320 controls the print device 23 to perform printing on roll paper based on the print command received by the printer communicator 22. When the print command is a command relating to receipt issuance, the print controller 320 causes the print device 23 to issue a receipt.

The first command executor 330 executes processing based on the device control command CD received by the printer communicator 22.

When the first function code is set in the function code portion KCB of the device control command CD, the first command executor 330 performs a process in accordance with validity or invalidity of the automatic notification of the status information SJ relating to the device 40 designated by the device designation parameter PR1. When a parameter indicating validity is set to the validity/invalidity designation parameter PR2, the first command executor 330 monitors whether the status information SJ has changed in a buffer area 210A corresponding to the device 40 designated by the device designation parameter PR1.

The buffer area 210A is a storage area allocated to each device 40 connectable to the printer 2 in the storage area of the shared buffer 210. For example, when four devices 40 can be connected to the printer 2 as shown in FIG. 1, the shared buffer 210 is provided with four buffer areas 210A. One buffer area 210A can store the input information NJ input from the corresponding device 40 and the status information SJ relating to the corresponding device 40. For example, when the device 40 is the bar code reader 42, the input information NJ corresponds to read information indicating a reading result. The status information SJ is information indicating various states relating to the device 40, and includes at least the buffer information BJ indicating presence or absence of the input information NJ in the buffer area 210A, the connection state information SJJ indicating a connection state with the printer 2, and the buffer state information BJJ indicating presence or absence of the buffer full state.

When the status information SJ changes, the first command executor 330 acquires the status information SJ after the change from the buffer area 210A to be monitored, and outputs the acquired status information SJ to the communication controller 350. The communication controller 350 transmits the input status information SJ to the host device 3 via the printer communicator 22. When a parameter indicating invalidity is set to the validity/invalidity designation parameter PR2, the first command executor 330 does not monitor whether the status information SJ has changed in the buffer area 210A corresponding to the device 40 designated by the device designation parameter PR1.

When the second function code is set in the function code portion KCB of the device control command CD, the first command executor 330 performs buffer clearing of the area storing the input information NJ in the buffer area 210A corresponding to the device 40 designated by the device designation parameter PR1.

When the third function code is set in the function code portion KCB of the device control command CD, the first command executor 330 acquires the input information NJ from the buffer area 210A corresponding to the device 40 designated by the device designation parameter PR1, and outputs the acquired input information NJ to the communication controller 350. The communication controller 350 transmits the input information NJ which has been input to the host device 3 via the printer communicator 22.

In addition, when the fourth function code is set in the function code portion KCB of the device control command CD, the first command executor 330 acquires information designated by the information designation parameter from the buffer area 210A corresponding to the device designated by the device designation parameter PR1. The first command executor 330 outputs the acquired information to the communication controller 350. The communication controller 350 transmits the information input from the first command executor 330 to the host device 3 via the printer communicator 22.

The second command executor 340 executes processing based on a command other than the print command and the device control command CD among the commands received by the printer communicator 22.

Next, the second printer controller 201 will be described. The second printer controller 201 has functions of a second operating system 400 and a device controller 410. The function of the second operating system 400 is the function of the control program stored in the second printer ROM 201B, and the other function is the function of the application program executed on the second operating system 400.

The second operating system 400 is, for example, Linux and is an operating system different from the first operating system 300 from the viewpoint of performing in a versatile manner communication control and various other processes that do not require real-time control. Linux is a registered trademark.

Thus, the first printer controller 200 and the second printer controller 201 share various different functions of the printer 2 and are configured to operate application programs on different operating systems suitable for sharing. As a result, the first printer controller 200 and the second printer controller 201 can perform parallel and appropriately shared processing, and can improve the processing capacity of the printer 2 as a whole.

The device controller 410 has functions of a connection monitor 411, a handler 412, and a storage controller 413.

The connection monitor 411 monitors whether the device 40 is connected to the printer 2. The connection monitor 411 monitors whether the device 40 is connected to the printer 2 by monitoring each of a plurality of ports provided in the device communicator 24. When the connection monitor 411 determines that the device 40 is connected to the printer 2, the connection monitor 411 detects the type of the connected device 40, adds type information indicating the type of the detected device 40, and outputs, to the storage controller 413, information indicating that the device 40 is connected. For example, when the port to be monitored is a USB port, the connection monitor 411 determines whether to detect the vendor ID and the product ID from the device 40 via the USB port. When the connection monitor 411 can detect the vendor ID and the product ID, the connection monitor 411 outputs, to the storage controller 413, information indicating that the device 40 is connected to the monitored USB port. When this output is performed, the connection monitor 411 adds type information of the device 40 corresponding to the combination of the detected vendor ID and product ID. The method of monitoring connection of the connection monitor 411 is not limited to the method described above, and an existing method in accordance with the communication standard can be used. Further, the method of detecting the type of the device 40 is not limited to the method described above, and various methods corresponding to the communication standard can be used.

The handler 412 is a functional block that mediates transmission and reception of information between a port of the device communicator 24 and a virtual port (not shown) of the storage controller 413. The virtual port of the storage controller 413 is a software port established as an interface through which the storage controller 413 transmits and receives information. In the present embodiment, the handler 412 outputs, to the storage controller 413, the input information NJ input from the device 40 through the port of the device communicator 24. At the time of output, the handler 412 can perform data conversion corresponding to the standard of the interface relating to the virtual port by the function of a port communication service (PCS).

The storage controller 413 stores various information for each of the buffer area 210A provided in the shared buffer 210.

When the input information NJ is input from the handler 412, the storage controller 413 stores the input information NJ in the buffer area 210A corresponding to the device 40 that has output the input information NJ. When the port number of the virtual port and the identification information for identifying the device 40 in the input information NJ are added, the storage controller 413 identifies the device 40 that has output the input information NJ based on the port number and the identification information. In addition, when the storage controller 413 stores the input information NJ in the buffer area 210A, the storage controller 413 stores, in the buffer area 210A, the buffer information BJ indicating that the input information NJ is present in the buffer area 210A. On the other hand, the storage controller 413 stores the buffer information BJ indicating that input information NJ is not present in the buffer area 210A in the buffer area 210A which does not store the input information NJ.

When the storage controller 413 receives, from the connection monitor 411, information indicating that the device 40 is connected, the storage controller 413 stores the connection state information SJJ indicating that the device 40 is connected in the buffer area 210A of the device 40 corresponding to the type information added to the information. The storage controller 413 stores the connection state information SJJ indicating no connection in the buffer area 210A corresponding to the device 40 where the information indicating the connection is not input from the connection monitor 411.

In addition, the storage controller 413 determines whether each of the buffer area 210A provided in the shared buffer 210 is in the buffer full state. For example, the storage controller 413 determines whether the buffer area 210A is in the buffer full state based on whether the ratio of the storage area storing the information to the storage area of the buffer area 210A exceeds a predetermined ratio. When the storage controller 413 determines that the buffer area is in the buffer full state, the storage controller 413 stores the buffer state information BJJ indicating that the buffer area 210A to be determined is in the buffer full state. On the other hand, when the storage controller 413 determines that the buffer area is not in the buffer full state, the storage controller 413 stores the buffer state information BJJ indicating that the buffer area 210A to be determined is not in the buffer full state.

Figure 4:
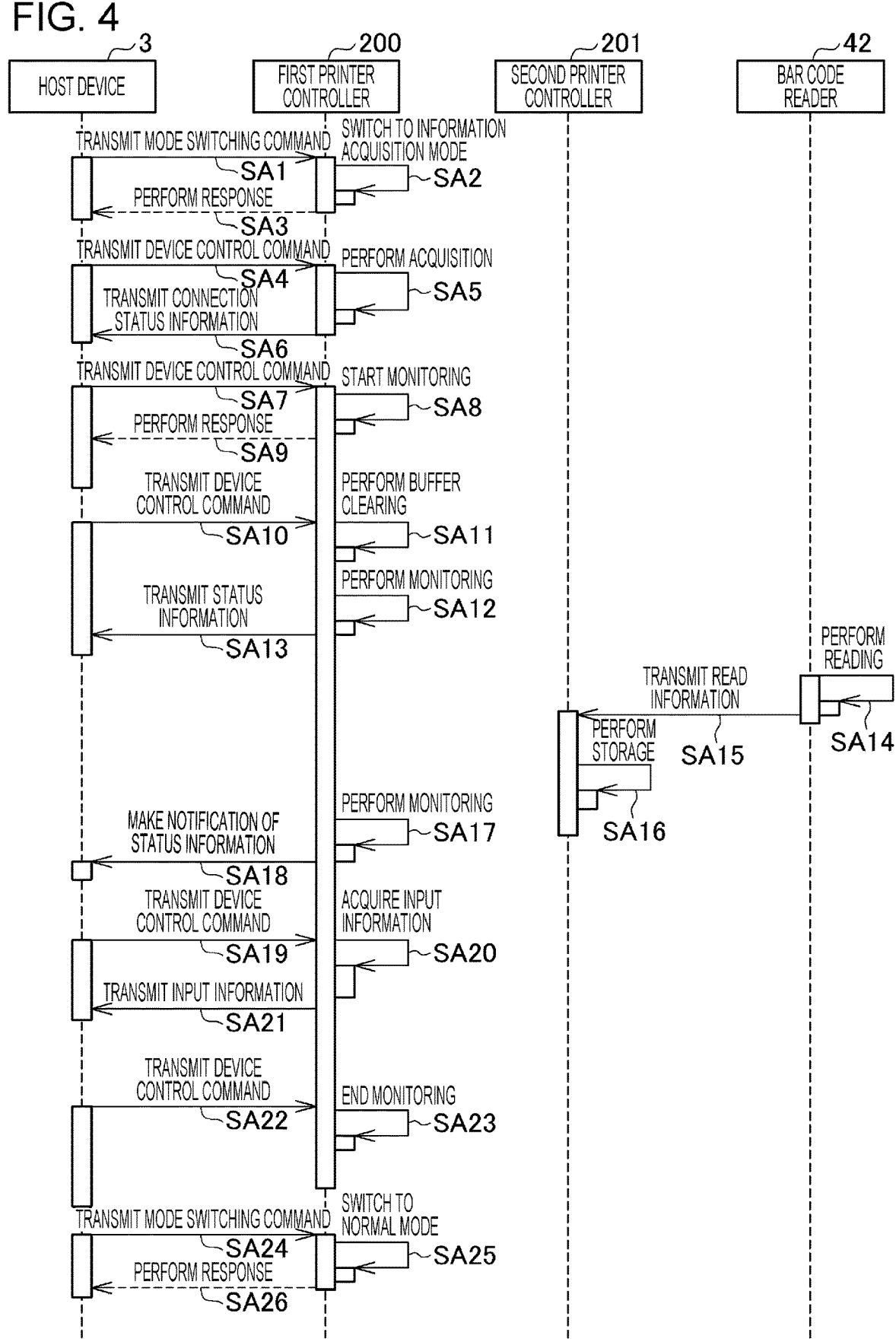
FIG. 4 is a sequence diagram showing the operation of a printing system.

Next, the operation of the printer 2 will be described. FIG. 4 is a sequence diagram showing the operation of the printing system 1. In the description using FIG. 4, it is assumed that only the bar code reader 42 is connected to the printer 2. Therefore, FIG. 4 shows the operations of the host device 3, the first printer controller 200, the second printer controller 201, and the bar code reader 42.

It is assumed that the operation mode of the printer controller 20 is the normal mode at the start of the operation in FIG. 4. The normal mode is an operation mode in which the first printer controller 200 can control the print device 23. The normal mode corresponds to the first mode. Further, it is assumed that the input information NJ is stored in the buffer area 210A corresponding to the bar code reader 42 at the start time of the operation in FIG. 4.

In the description using FIG. 4, it is assumed that the reading by the bar code reader 42 is performed once.

The host controller 30 of the host device 3 transmits a mode switching command to the printer 2 by the host communicator 33 in order to switch the operation mode of the printer controller 20 from the normal mode to the information acquisition mode (step SA1). The information acquisition mode is an operation mode in which the first printer controller 200 performs the process without operating the print device 23, and is an operation mode dedicated to acquisition of information from the shared buffer 210. The information acquisition mode corresponds to the second mode.

When the printer communicator 22 receives the mode switching command, the second command executor 340 of the first printer controller 200 performs the mode switching command to switch the operation mode of the first printer controller 200 from the normal mode to the information acquisition mode (step SA2). The mode switching command is a real time command. Therefore, when the second command executor 340 receives the mode switching command, the second command executor 340 switches the operation mode prior to a process based on the unprocessed command received before receiving the mode switching command.

When the first printer controller 200 switches the operation mode to the information acquisition mode, the first printer controller 200 transmits, to the host device 3 through the printer communicator 22, information indicating that the operation mode has been switched to the information acquisition mode as a response to the received mode switching command (step SA3).

When the host controller 30 of the host device 3 receives the information indicating that the operation mode of the first printer controller 200 has switched to the information acquisition mode, the device control command CD in which the fourth function code is set in the function code portion KCB is transmitted by the host communicator 33 (step SA4). For the device control command CD transmitted here, an information designation parameter PR4 to which a parameter indicating the connection state information SJJ is set is included in the parameter portion PRB.

In step SA4, the host controller 30 transmits, to the printer 2, the device control command CD in which the parameter designating the connection state information SJJ are set to the information designation parameter PR4 for the number of the devices 40 connectable to the printer 2. For example, it is assumed that the device 40 connectable to the printer 2 is four different types of devices 40 shown in FIG. 1. In this case, the host controller 30 transmits the device control command CD in which the parameter designating the customer display 41 is set to the device designation parameter PR1. Further, in this case, the host controller 30 transmits the device control command CD in which the parameter designating the bar code reader 42 is set to the device designation parameter PR1. Further, in this case, the host controller 30 transmits the device control command CD in which the parameter designating the card reader 43 is set to the device designation parameter PR1. Further, in this case, the host controller 30 transmits the device control command CD in which the parameter designating the automatic change machine 44 is set to the device designation parameter PR1.

The first command executor 330 of the first printer controller 200 acquires the connection state information SJJ from the shared buffer 210 based on the device control command CD received by the printer communicator 22 (step SA5).

In the description with reference to FIG. 4, the device 40 connected to the printer 2 is only the bar code reader 42. Therefore, the shared buffer 210 stores the connection state information SJJ indicating that the bar code reader 42 is connected to the buffer area 210A corresponding to the bar code reader 42. On the other hand, the shared buffer 210 stores the connection state information SJJ indicating that the device 40 is not connected to the buffer area 210A corresponding to the devices 40 other than the bar code reader 42. In step SA5, the first command executor 330 of the first printer controller 200 acquires the connection state information SJJ indicating the presence of the connection for the device control command CD in which the parameter designating the bar code reader 42 is set to the device designation parameter PR1. On the other hand, the first command executor 330 acquires the connection state information SJJ indicating the absence of the connection for the device control command CD in which the parameter designating the devices 40 other than the bar code reader 42 are set to the device designation parameter PR1.

When the first command executor 330 acquires the connection state information SJJ, the communication controller 350 of the first printer controller 200 transmits the acquired connection state information SJJ to the host device 3 through the printer communicator 22 (step SA6). Here, the communication controller 350 preferably adds identification information of the corresponding device 40 to each of the connection state information SJJ. As a result, the host device 3 that has received the connection state information SJJ can uniquely identify which connection state information SJJ corresponds to which device 40. The identification information mentioned here is, for example, a parameter set to the device designation parameter PR1.

The host controller 30 of the host device 3 transmits, to the printer 2, the device control command CD in which the first function code is set in the function code portion KCB and the parameter indicating validity is set to the validity/invalidity designation parameter PR2 (step SA7).

In step SA7, the host controller 30 transmits, to the printer 2 through the host communicator 33, the device control command CD in which the parameter designating the bar code reader 42 is set to the device designation parameter PR1. That is, in step SA7, the host controller 30 transmits the device control command CD in which the parameter designating the device 40 connected to the printer 2 is set to the device designation parameter PR1. The host controller 30 determines the presence or absence of the connection with the printer 2 based on the connection state information SJJ received in step SA6.

The host controller 30 may transmit the device control command CD to the printer 2 for the number of devices 40 connectable to the printer 2 regardless of the presence or absence of the connection as in the transmission mode of the device control command CD in step SA4.

Next, the first command executor 330 of the first printer controller 200 starts the monitoring of whether the status information SJ has changed in the buffer area 210A corresponding to the bar code reader 42 based on the device control command CD (Step SA8). The first printer controller 200 does not execute the monitoring for the buffer area 210A corresponding to the bar code reader 42 in step SA8. As described above, the first command executor 330 of the first printer controller 200 performs the monitoring only on the buffer area 210A corresponding to the device 40 connected to the printer 2 to achieve the following effects.

In the buffer area 210A corresponding to the device 40 connected to the printer 2, there is a high probability that the status information SJ changes due to the storage of the input information NJ or the like. On the other hand, in the buffer area 210A corresponding to the device 40 not connected to the printer 2, there in a low probability that the status information SJ changes. Therefore, by monitoring only the buffer area 210A with high probability that the status information SJ changes, the first command executor 330 can efficiently monitor the shared buffer 210, and can reduce the processing load relating to the monitoring.

When the first command executor 330 of the first printer controller 200 starts the monitoring of the buffer area 210A, the first command executor 330 transmits, to the host device 3 through the printer communicator 22, information indicating that the monitoring has been started as a response to the device control command CD transmitted from the host device 3 in step SA7 (step SA9).

The host controller 30 of the host device 3 transmits, to the printer 2, the device control command CD in which the second function code is set in the function code portion KCB (step SA10).

In step SA10, the host controller 30 transmits, to the printer 2 through the host communicator 33, the device control command CD in which the parameter designating the bar code reader 42 is set to the device designation parameter PR1. That is, in step SA7, the host controller 30 transmits the device control command CD in which the parameter designating the device 40 connected to the printer 2 is set to the device designation parameter PR1.

Next, the first command executor 330 of the first printer controller 200 performs buffer clearing of the area storing the input information NJ of the buffer area 210A corresponding to the bar code reader 42 (step SA11). The input information NJ stored before switching to the information acquisition mode is highly likely not to be acquired in the current information acquisition mode. Therefore, the first command executor 330 performs buffer clearing so that the host device 3 does not acquire the input information NJ that is not to be acquired.

The first command executor 330 monitors the buffer area 210A of which the buffer clearing has been performed (step SA12). Since the buffer clearing is performed, the input information NJ is cleared from the buffer area 210A corresponding to the bar code reader 42. As a result, the buffer information BJ indicating that the input information NJ is not present is stored in the buffer area 210A corresponding to the bar code reader 42, and the status information SJ changes. Then, the first command executor 330 acquires the changed the status information SJ from the buffer area 210A corresponding to the bar code reader 42. The acquired status information SJ includes the buffer information BJ indicating that the input information NJ is not present. The first command executor 330 outputs the acquired status information SJ to the communication controller 350. The communication controller 350 transmits the status information SJ to the host device 3 through the printer communicator 22 (step SA13). As a result, the host device 3 can determine that the input information NJ is not present in the buffer area 210A corresponding to the bar code reader 42.

When the user performs the reading through the bar code reader 42 (step SA14), the bar code reader 42 transmits the read information which is the input information NJ to the printer 2 to the printer 2 (step SA15).

The storage controller 413 of the second printer controller 201 stores the input information NJ input from the bar code reader 42 in the buffer area 210A corresponding to the bar code reader 42 (step SA16).

The first command executor 330 monitors the buffer area 210A of which the buffer clearing has been performed (step SA17). Since the storage controller 413 of the second printer controller 201 stores the input information NJ in the buffer area 210A corresponding to the bar code reader 42, the buffer area 210A stores the buffer information BJ indicating that the input information NJ is present. As a result, the status information SJ changes in the buffer area 210A corresponding to the bar code reader 42. Then, the first command executor 330 acquires the changed the status information SJ from the buffer area 210A corresponding to the bar code reader 42. The acquired status information SJ includes the buffer information BJ indicating that the input information NJ is present. The first command executor 330 outputs the acquired status information SJ to the communication controller 350. The communication controller 350 transmits the status information SJ to the host device 3 through the printer communicator 22 (step SA18). As a result, the host device 3 can determine that the input information NJ is not present in the buffer area 210A corresponding to the bar code reader 42.

In step SA18, the information to be transmitted from the printer 2 to the host device 3 is the status information SJ and not the input information NJ. Generally, the communication path between the host communicator 33 and the printer communicator 22 is not always established as in the case where the communication standard is a standard relating to wireless communication such as Wi-Fi or Bluetooth. Therefore, when the input information NJ is stored in the buffer area 210A corresponding to the bar code reader 42 and the status information SJ is changed, the host device 3 may not receive the input information NJ in a case where the configuration is such that the input information NJ is transmitted to the host device 3. Therefore, as described above, when the status information SJ changes, the printer controller 20 does not transmit the input information NJ, but transmits the changed status information SJ, thereby first notifying the host device 3 that the input information NJ has been stored in first. As a result, the printer controller 20 can ensure that the host device 3 can acquire the input information NJ.

The host controller 30 of the host device 3 transmits, to the printer 2, the device control command CD in which the third function code is set in the function code portion KCB (step SA19).

In step SA19, the host controller 30 transmits, to the printer 2 through the host communicator 33, the device control command CD in which the parameter designating the bar code reader 42 is set to the device designation parameter PR1. That is, in step SA19, the host controller 30 transmits the device control command CD in which the parameter designating the device connected to the printer 2 is set to the device designation parameter PR1.

Next, the first command executor 330 of the first printer controller 200 acquires the input information NJ from the buffer area 210A corresponding to the bar code reader 42 based on the device control command CD (step SA20). The first command executor 330 outputs the acquired input information NJ to the communication controller 350. The communication controller 350 transmits the input information NJ to the host device 3 through the printer communicator 22 (step SA21).

As a result, the host device 3 can acquire the reading result of the bar code reader 42, and can generate, for example, a print command based on the reading result. More specifically, the host device 3 can communicate with a POS server (not shown) to acquire accounting information based on the reading result, and can generate a print command relating to issuance of a receipt on which the acquired accounting information is printed.

The host controller 30 of the host device 3 transmits, to the printer 2, the device control command CD in which the first function code is set in the function code portion KCB and the parameter indicating invalidity is set to the validity/invalidity designation parameter PR2 (step SA22).

In step SA22, the host controller 30 transmits, to the printer 2 through the host communicator 33, the device control command CD in which the parameter designating the bar code reader 42 is set to the device designation parameter PR1. That is, in step SA22, the host controller 30 transmits the device control command CD in which the parameter designating the device 40 connected to the printer 2 is set to the device designation parameter PR1.

Next, the first command executor 330 of the first printer controller 200 ends the monitoring of whether the status information SJ has changed in the buffer area 210A corresponding to the bar code reader 42 (Step SA23). When the first command executor 330 of the first printer controller 200 ends the monitoring of the buffer area 210A, the first command executor 330 may transmit, to the host device 3 through the printer communicator 22, information indicating that the monitoring has been ended as a response to the device control command CD transmitted from the host device 3 in step SA23.

The host controller 30 of the host device 3 transmits a mode switching command to the printer 2 by the host communicator 33 in order to switch the operation mode of the printer controller 20 from the information acquisition mode to the normal mode (step SA24).

When the printer communicator 22 receives the mode switching command, the second command executor 340 of the first printer controller 200 performs the mode switching command to switch the operation mode of the first printer controller 200 from the information acquisition mode to the normal mode (step SA25).

When the first printer controller 200 switches the operation mode to the normal mode, the first printer controller 200 transmits information indicating that the operation mode has been switched to the normal mode to the host device 3 through the printer communicator 22 as a response to the received mode switching command (step SA26).

As a result, the printer 2 can perform printing based on the print command received from the host device 3, so that the printing can be performed based on the reading result acquired in the information acquisition mode. For example, the printer 2 can issue a receipt based on the reading result of the bar code reader 42.

The process of steps SA22 and SA23 in FIG. 4 is illustrated for the sake of convenience for explaining the invalidity of the automatic notification of the status information SJ. The process of steps SA22 and SA23 is not essential when switching from the information acquisition mode to the normal mode. In stead of setting the invalidity of the automatic notification, the first printer controller 200 may switch the operation mode from the information acquisition mode to the normal mode. In this case, when the input information NJ is stored and the status information SJ is changed in the normal mode, the first printer controller 200 transmits the changed status information SJ to the host device 3. When acquiring the input information NJ, the host device 3 sets the operation mode of the first printer controller 200 to the information acquisition mode, and transmits the device control command CD in which the third function code is set in the function code portion KCB.

As described above, when the first printer controller 200 receives the device control command CD including the device designation parameter PR1 designating the predetermined device 40, the printer controller 20 acquires the status information SJ including the buffer information BJ, or the input information NJ from the shared buffer 210. As a result, the printer controller 20 can perform a process in accordance with the presence or absence of the input information NJ regarding the device 40 designated by the device control command CD. The process in accordance with the presence or absence of the input information NJ includes, for example, transmitting the buffer information BJ indicating that the input information NJ is present, transmitting the buffer information BJ indicating that the input information NJ is not present, and transmitting the input information NJ when the input information NJ is present. Therefore, the printer controller 20 can perform the process in accordance with the presence or absence of the input information NJ from the device 40 for each of the plurality of devices 40 by one type of command.

Further, when the input information NJ is present in the buffer area 210A corresponding to the device 40 designated by the device designation parameter PR1, the printer controller 20 transmit to the host device 3 the buffer information BJ indicating that the input information NJ is present or the input information NJ. As a result, the host device 3 can perform the process based on the presence of the input information NJ. The process based on the presence of the input information NJ is a process of acquiring the input information NJ by transmitting the device control command CD in which the third function code is set in the function code portion KCB. The host device 3 can perform the process based on the input information NJ such as generation of a print command.

Further, when the input information NJ is not present in the buffer area 210A corresponding to the device 40 designated by the device designation parameter PR1, the printer controller 20 transmits, to the host device 3, information indicating that input information NJ is not present. As a result, the host device 3 can determine that there is no input of the input information NJ from the designated device 40. Therefore, the host device 3 can acquire the input information NJ without unnecessarily transmitting the device control command CD, so that the processing efficiency in acquiring the input information NJ is improved.

Further, when the operation mode is the information acquisition mode, the printer controller 20 performs the process based on the device control command CD. As described above, the normal mode is an operation mode for controlling the print device 23, and the information acquisition mode is an operation mode for performing the process without operating the print device 23. Therefore, when the operation mode is only the normal mode and it is not possible to perform control of the print device 23 as in the case where an error occurs to the print device 23, the printer controller 20 can not switch the operation mode, so that is may not be possible to perform the process based on the device control command CD. That is, the host device 3 may not acquire the input information NJ from the printer 2. Therefore, the printer controller 20 is configured to be able to switch the operation mode to the information acquisition mode, and transmits, to the host device 3, the input information NJ in the information acquisition mode. As a result, even when the print device 23 can not be controlled, the printer controller 20 can transmit the input information NJ to the host device 3 and the host device 3 can acquire the input information NJ.

The printer controller 20 controls the print device 23 when the printer communicator 22 receives a print command, and performs the process based on the device control command CD when the printer communicator 22 receives a device control command CD. That is, the communication path through which the print command is transmitted is the same as the communication path through which the device control command CD is transmitted. In general, a communication path through which a command that controls the device 40 is transmitted is a communication path for communicating with a device such as a Web server connected to the global network. Therefore, when the environment in which the printing system 1 is constructed is an environment in which a communication path for communicating with a device such as a Web server connected to the global network can not be established, the host device 3 may not acquire the input information NJ or the status information SJ of the device 40 from the printer 2. However, the communication path through which the device control command CD is transmitted is the same as the communication path through which the print command is transmitted. Therefore, the host device 3 can acquire the input information NJ or the status information SJ even in an environment where a communication path with a device such as a Web server connected to the global network can not be established.

Further, when receiving the device control command CD, the printer controller 20 monitors the buffer area 210A corresponding to the device 40 designated by the device designation parameter PR1 to monitor the presence or absence of the input information NJ. When the input information NJ is stored in the buffer area 210A, the printer controller 20 transmits to the host device 3 the buffer information BJ indicating that the input information NJ is present. As described above, by monitoring the buffer area 210A, the printer controller 20 can easily monitor the presence or absence of the input information NJ from the device 40 designated by the device designation parameter PR1. Further, when the input information NJ is stored, since the printer controller 20 monitors the shared buffer 210, the printer controller 20 can promptly transmit the buffer information BJ indicating the presence of the input information NJ.

FIG. 4 describes the operation of the printing system 1 when the host device 3 acquires the input information NJ by transmitting the device control command CD after setting the automatic notification of the status information SJ to valid. However, when receiving the device control command CD in which the third function code is set in the function code portion KCB, the printer controller 20 performs the process based on the received device control command CD regardless of whether the automatic notification of the status information SJ is valid or invalid.

Figure 5:
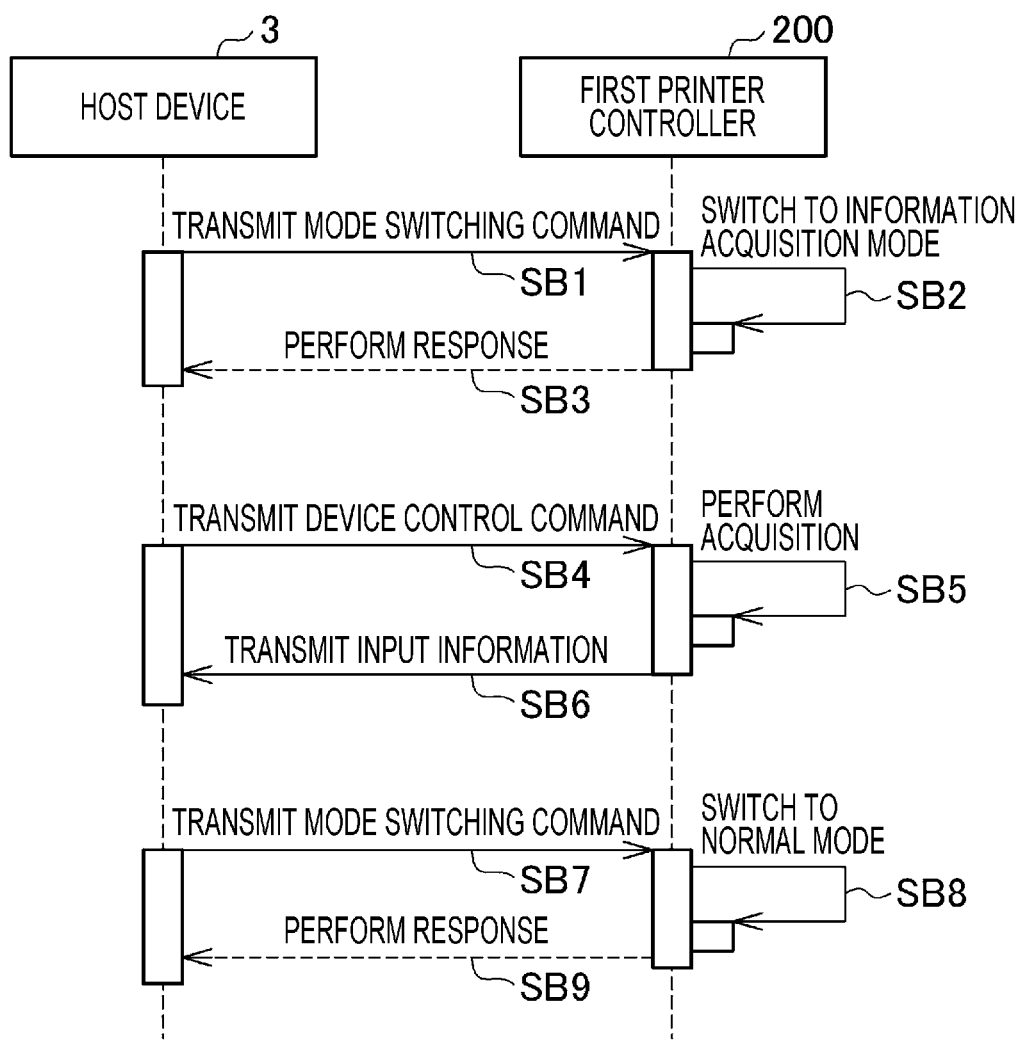
FIG. 5 is a sequence diagram showing the operation of the printing system.

FIG. 5 is a sequence diagram showing the operation of the printing system 1. It is assumed that the operation mode of the printer controller 20 is the normal mode at the start of the operation in FIG. 5. Further, it is assumed that the automatic notification of the status information SJ is invalid, and the first command executor 330 does not monitor any buffer area 210A. Further, in the description of FIG. 5, it is assumed that the input information NJ is stored in the buffer area 210A corresponding to the device 40 designated by the device designation parameter PR1 of the device control command CD.

When acquiring the input information NJ, the host controller 30 of the host device 3 switches the operation mode of the printer controller 20 from the normal mode to the information acquisition mode. In order to perform the switch, the host controller 30 transmits a mode switching command to the printer 2 through the host communicator 33 (step SB1).

When the printer communicator 22 receives the mode switching command, the first command executor 330 of the first printer controller 200 performs the mode switching command to switch the operation mode of the first printer controller 200 from the normal mode to the information acquisition mode (step SB2).

When the first printer controller 200 switches the operation mode to the information acquisition mode, the first printer controller 200 transmits, to the host device 3 through the printer communicator 22, information indicating that the operation mode has been switched to the information acquisition mode as a response to the received mode switching command (step SB3).

When receiving the response, the host controller 30 of the host device 3 transmits, to the printer 2, the device control command CD in which the third function code is set in the function code portion KCB (step SB4).

In step SB4, the host controller 30 transmits, to the printer 2 through the host communicator 33, the device control command CD in which the parameter designating the bar code reader 42 is set to the device designation parameter PR1. That is, in step SB4, the host controller 30 transmits the device control command CD in which the parameter designating the device 40 connected to the printer 2 is set to the device designation parameter PR1.

Next, the first command executor 330 of the first printer controller 200 acquires the input information NJ from the buffer area 210A corresponding to the bar code reader 42 based on the device control command CD (step SB5). The first command executor 330 outputs the acquired input information NJ to the communication controller 350. The communication controller 350 transmits the input information NJ to the host device 3 through the printer communicator 22 (step SB6).

The host controller 30 of the host device 3 transmits a mode switching command to the printer 2 by the host communicator 33 in order to switch the operation mode of the printer controller 20 from the information acquisition mode to the normal mode (step SB7).

When the printer communicator 22 receives the mode switching command, the first command executor 330 of the first printer controller 200 performs the mode switching command to switch the operation mode of the first printer controller 200 from the information acquisition mode to the normal mode (step SB8).

When the first printer controller 200 switches the operation mode to the normal mode, the first printer controller 200 transmits information indicating that the operation mode has been switched to the normal mode to the host device 3 through the printer communicator 22 as a response to the mode switching command (step SB9).

As a result, the printer 2 can perform printing based on the print command received from the host device 3, so that the printing can be performed based on the reading result acquired in the information acquisition mode.

As described above, the printer controller 20 performs the process based on the device control command CD in which the third function code is set in the function code portion KCB regardless of whether the automatic notification is valid or invalid. As a result, when the automatic notification of the status information SJ is invalid, the host device 3 can acquire the input information NJ even without transmitting the device control command CD in which the first function code is set in the function code portion KCB. Therefore, the host device 3 does not have to transmit many commands, and can quickly acquire the input information NJ from the printer 2.

Although the above description exemplifies the case where the mode switching command is a real time command, the device control command CD may also be a real time command. In this way, for example, when the device control command CD is received from the host device 3 in a case in which the printer 2 receives one or more print commands, the printer controller 20 performs the process based on the device control command CD prior to a process based on the received print command. As a result, the printer controller 20 can quickly perform the process based on the device control command CD. When the device control command CD is a real-time command, the mode switching command may be transmitted only when the print device 23 can not be controlled, so that the host device 3 can cause the printer 2 to perform the process based on the device control command CD without transmitting a lot of commands. The printer controller 20 performs the process based on commands in an order of reception for commands other than the real-time command.

The device control command CD may be a real time command regardless of the function code, or may or may not be a real time command in accordance with the function code.

As described above, the printer 2 includes the printer communicator 22 capable of communicating with the host device 3, the device communicator 24 capable of communicating with the plurality of devices 40, the printer controller 20 that performs the process based on the command acquired via the printer communicator 22, and the shared buffer 210 configured to store input information NJ corresponding to each of the plurality of devices 40 wherein the input information NJ is acquired via the device communicator 24. When the printer communicator 22 receives the device control command CD including the device designation parameter PR1 designating the predetermined device 40 among the plurality of devices 40, the printer controller 20 acquires, from the shared buffer 210, the buffer information BJ indicating whether the input information NJ corresponding to the predetermined device 40 designated by the device designation parameter PR1 is present in the shared buffer 210 or the input information NJ.

According to this configuration, the printer controller 20 can perform a process in accordance with the presence or absence of the input information NJ regarding the device 40 designated by the device control command CD. Therefore, the printer controller 20 can perform the process in accordance with the presence or absence of the input information NJ from the device 40 for each of the plurality of devices 40 by one type of command.

When the input information NJ corresponding to the predetermined device 40 designated by the device designation parameter PR1 is present in the shared buffer 210, the printer controller 20 transmit to the host device 3 the buffer information BJ indicating that the input information NJ is present or the input information NJ.

According to this configuration, the printer controller 20 can transmit, to the host device 3, the buffer information BJ indicating that the input information NJ is present or the input information NJ for each of the plurality of devices 40 based on one type of command. Therefore, by transmitting one type of command to the printer 2, the host device 3 can perform the process based on the presence of the input information NJ for each of the plurality of devices 40, and can perform the process based on the input information NJ such as generation of a print command.

When the input information NJ corresponding to the predetermined device 40 designated by the device designation parameter PR1 is not present in the shared buffer 210, the printer controller 20 transmit to the host device 3 the buffer information BJ indicating that input information NJ is not present.

According to this configuration, the host device 3 can determine that there is no input of the input information NJ from the designated device 40. Therefore, the host device 3 can acquire the input information NJ without unnecessarily transmitting the device control command CD, so that the processing efficiency in acquiring the input information NJ is improved.

The printer 2 includes the print device 23 that performs printing on roll paper. The printer controller 20 is configured to be switchable between a normal mode for controlling the print device 23 and an information acquisition mode for performing the process without operating the print device 23, and in the information acquisition mode, performs the process based on the device control command CD.

According to this configuration, even when the printer controller 20 can not control the print device 23 in the normal mode, the printer controller 20 can transmit the input information NJ to the host device 3 by switching the operation mode to the information acquisition mode.

The printer controller 20 controls the print device 23 when the command received by the printer communicator 22 is a print command, and performs the process based on the device control command CD when the command received by the printer communicator 22 is a device control command CD.

According to this configuration, the communication path through which the device control command CD is transmitted is the same as the communication path through which the print command is transmitted. Therefore, the printer controller 20 can transmit the input information NJ and the status information SJ even in an environment where a communication path with a device such as a Web server connected to the global network can not be established, and the host device 3 can acquire the input information NJ and the status information SJ.

When the printer communicator 22 receives the device control command CD while the printer controller 20 performs the commands received by the printer communicator 22 in an order of reception, the printer controller 20 performs the process based on the device control command CD prior to a process based on the command received before receiving the device control command CD.

According to this configuration, the printer controller 20 can quickly perform the process based on the device control command CD, and can perform the process based on the device control command CD at any timing when the user operate the process.

In a case where the printer communicator 22 receives the device control command CD when the printer controller 20 can not perform the control of the print device 23 based on the print command, the printer controller 20 performs the process based on the device control command CD.

According to this configuration, when the printer controller 20 can not control the print device 23 in the normal mode, the printer controller 20 can transmit the input information NJ to the host device 3 by switching the operation mode to the information acquisition mode.

When the printer communicator 22 receive the device control command CD, the printer controller 20 monitors the presence or absence of the input information NJ corresponding to the predetermined device 40 designated by the device designation parameter PR1. When the input information NJ is stored in the shared buffer 210, the printer controller 20 transmits to the host device 3 the buffer information BJ indicating that the input information NJ is present.

As described above, by monitoring the buffer area 210A, the printer controller 20 can easily monitor the presence or absence of the input information NJ from the device 40 designated by the device designation parameter PR1. Further, when the input information NJ is stored, since the printer controller 20 monitors the shared buffer 210, the printer controller 20 can promptly transmit the buffer information BJ indicating the presence of the input information NJ.

The printer 2 includes the printer communicator 22 capable of communicating with the host device 3, the device communicator 24 capable of communicating with a plurality of devices, a first printer controller that performs the process based on a command acquired via the printer communicator 22, a second printer controller that control the devices via the device communicator 24, and the shared buffer 210 to and from which the first printer controller and the second printer controller can perform input and output of information, and which is capable of storing the input information NJ corresponding each of the plurality of devices 40 by the second printer controller 201. When the printer communicator 22 receives the device control command CD including the device designation parameter PR1, the first printer controller 200 acquires, from the shared buffer 210, the buffer information BJ indicating whether the input information NJ corresponding to the predetermined designated device 40 is present in the shared buffer 210 or the input information NJ.

As described above, since the first printer controller 200 and the second printer controller 201 can perform processes in parallel and appropriately by sharing the functions, the processing capacity of the printer 2 can be improved as a whole. Therefore, the first printer controller 200 can perform the process in accordance with the presence or absence of the input information NJ from the device 40 for each of the plurality of devices 40 by one type of command while improving the processing capacity of the printer 2 as a whole.

The embodiment described above is merely an aspect of the present disclosure, and any modification and application can be made within the scope of the present disclosure.

For example, in the embodiment described above, the customer display 41, the bar code reader 42, the card reader 43, and the automatic change machine 44 are illustrated as devices connectable to the printer 2. However, the device connectable to the printer 2 is not limited to these devices 40, and may be another device such as a drawer. When the another device can be connectable, the host device 3 may set a parameter corresponding to the another device to the device designation parameter PR1. Therefore, the user does not have to create a new command, perform a registration to the host device 3 or the like.

For example, in the embodiments described above, the first function, the second function, the third function, and the fourth function are described as the function of the device control command CD, but the function of the device control command CD is limited to these. Many other functions may be provided. In this case, function code corresponding to another function is set in the function code portion KCB, and the parameter portion PRB corresponding to the another function is set.

As another function of the device control command CD, for example, the fifth function which is a function of transmitting binary data may be provided in the device 40. When the function code indicating the fifth function is set as the "fifth function code" and the fifth function code is set in the function code portion KCB, the device designation parameter PR1 and the binary data designation parameter are set in the parameter portion PRB. The binary data designation parameter is a parameter designating binary data. When the fifth function code is set in the function code portion KCB of the received device control command CD, the first command executor 330 transmits, to the device 40 designated by the device designation parameter PR1, binary data designated by the binary data designation parameter. An example of binary data to be designated includes a setting value to be set to the device 40. In this case, the host device 3 can perform various settings on the device 40 by transmitting a device control command CD.

Further, for example, when the control method of the printer 2 indicated by the operation of the printer 2 described above is implemented by using a computer of the printer 2 or an external device connected to the printer 2, the present disclosure may be configured in the form of a program executed by a computer to implement the above control method, a recording medium recording the program in a computer-readable manner, or a transmission medium for transmitting the program. The control method of the printer 2 corresponds to the method of the printing apparatus.

The functions of the host controller 30, the first printer controller 200, and the second printer controller 201 may be implemented by a plurality of processors or semiconductor chips.

Moreover, respective sections shown in FIG. 1 and FIG. 2 are an example, and the present disclosure is not particularly limited a specific mounting form. That is, it is not always necessary to implement hardware corresponding to respective sections, but it is of course possible to construct a configuration in which the functions of the respective sections are implemented by executing a program by one processor. In addition, in the above embodiments, part of the functions implemented by software may be implemented by hardware, or part of the functions implemented by hardware may be implemented by software. In addition, specific detailed configurations of other sections of the printer 2 and the host device 3 can be changed in any manner without departing from the scope of the present disclosure.

Further, for example, the step units of the operations shown in FIG. 4 and FIG. 5 are divided in accordance with the main processing contents in order to facilitate understanding of the operations of the respective sections of the printing system 1. The present disclosure is not limited by the method and name of division. Thus, the present disclosure is not limited to how the processing is divided into process units or the names of the process units. Depending on the processing contents, the process may be divided into more step units. Further, one step unit may be divided so as to include more processes. In addition, the order of the steps may be changed as appropriate within the scope of the present disclosure.

What is claimed is:

1. A printing apparatus, comprising:
    a first communicator configured to communicate with a control device;
    a second communicator configured to communicate with a plurality of peripheral devices;
    a controller performing a process based on a command acquired via the first communicator; and
    a buffer configured to store input information acquired via the second communicator, the input information corresponding to each of the plurality of peripheral devices,
    wherein, when the first communicator receives a device control command including designation information that designates a predetermined peripheral device of the plurality of peripheral devices, the controller acquires, from the buffer, buffer information, and
    wherein the buffer information indicates whether the input information corresponding to the predetermined peripheral device designated by the designation information is present in the buffer.

2. The printing apparatus according to claim 1, wherein:
    when the buffer information indicates that the input information corresponding to the predetermined peripheral device designated by the designation information is present in the buffer, the controller transmits to the control device either the buffer information indicating that the input information is present or the input information.

3. The printing apparatus according to claim 1, wherein:
    when the buffer information indicates that the input information corresponding to the predetermined peripheral device designated by the designation information is not present in the buffer, the controller transmits to the control device the buffer information indicating that the input information is not present.

4. The printing apparatus according to claim 1, further comprising:
    a print device that performs printing on a print medium, wherein the controller:
        is configured to switch between a first mode for controlling the print device and a second mode for performing a process without operating the print device, and
        performs the process based on the device control command when the controller is in the second mode.

5. The printing apparatus according to claim 4, wherein:
    the controller:
        controls the print device when the command received by the first communicator is a print command, and
        performs a process based on the device control command when the command received by the first communicator is the device control command.

6. The printing apparatus according to claim 5, wherein:
    while performing the command received by the first communicator in an order of reception, the controller performs the process based on the device control command prior to a process based on the command received before the device control command is received when the first communicator receives the device control command.

7. The printing apparatus according to claim 5, wherein:
    the controller:
        performs the process based on the device control command in a case in which the first communicator receives the device control command when the controller is not able to perform control of the print device based on the print command.

8. The printing apparatus according to claim 1, wherein:
    the controller:
        monitors a presence or absence of the input information corresponding to the predetermined peripheral device designated by the designation information when the first communicator receives the device control command, and
        transmits to the control device buffer information indicating that the input information is present when the input information is stored in the buffer.

9. A printing apparatus, comprising:
    a first communicator configured to communicate with a control device;
    a second communicator configured to communicate with a plurality of peripheral devices;
    a first controller configured to perform a process based on a command acquired via the first communicator;
    a second controller configured to control the peripheral devices via the second communicator; and
    a buffer configured to store, by the second controller, input information corresponding to each of the plurality of peripheral devices,
    wherein, when the first communicator receives a device control command including designation information that designates a predetermined peripheral device of the plurality of peripheral devices, the first controller acquires, from the buffer, buffer information, and wherein the buffer information indicates whether the input information corresponding to the predetermined peripheral device designated by the designation information is present in the buffer.

10. A control method of a printing apparatus, the printing apparatus including a first communicator configured to communicate with a control device, a second communicator configured to communicate with a plurality of peripheral devices, and a buffer configured to store input information acquired via the second communicator, the input information corresponding to each of the plurality of peripheral devices, the control method comprising:

acquiring, from the buffer, buffer information indicating or the input information, when the first communicator receiving a device control command including designation information that designates a predetermined peripheral device of the plurality of peripheral devices, and wherein the buffer information indicates whether the input information corresponding to the predetermined peripheral device designated by the designation information is present in the buffer.

* * * * *